United States Patent

[11] 3,614,213

| [72] | Inventor | Timothy K. Mahoney<br>4256 39th Ave. South, Minneapolis, Minn. 55406 |
|---|---|---|
| [21] | Appl. No. | 18,877 |
| [22] | Filed | Mar. 12, 1970 |
| [45] | Patented | Oct. 19, 1971 |

[54] ARTISTIC REFLECTOR VIEWER
4 Claims, 4 Drawing Figs.
[52] U.S. Cl. .................................................. 350/299, 40/125
[51] Int. Cl. ..................................................... G02b 17/00
[50] Field of Search .......................................... 350/4, 288, 299; 40/125

[56] References Cited
UNITED STATES PATENTS
2,698,177  12/1954  Engman .................... 350/299
3,102,920  9/1963  Sirong ....................... 331/94.5

Primary Examiner—David Schonberg
Assistant Examiner—Michael J. Tokar
Attorney—Williamson, Palmatier & Bains ABSTRACT: An artistic-viewing device which, through the effects of internal opposed and angularly related mirrors, produces a variety of symmetrical optical illusions. The structure includes a three-dimensional housing having at least two pairs of opposing generally transparent walls, the interiors of said walls at portions thereof being covered by at least two sets of opposing spaced mirrors. The mirrors preferably are of elongate construction diagonally disposed with reference to the shapes of the sides of the housing and in opposing sets have their longitudinal centerlines disposed in crossed relation.

PATENTED OCT 19 1971 3,614,213

INVENTOR.
TIMOTHY K. MAHONEY
BY
Williamson Palmatier & Bains
ATTORNEYS

ARTISTIC REFLECTOR VIEWER

It is an object of this invention to provide an artistic viewing device of three-dimensional form, preferably cubical or the shape of a parallelepiped, which, when the interior is viewed from a number of different viewing points, will present and produce a substantial variety of optical illusions varying in artistic pattern but, through the utilization of a plurality of opposing mirrors on the inside walls of the housing, producing images or illusions in the nature of tunnels and corridors defined by various colors and certain effects constituting a part of the housing or shell which generally consist in an infinite number of corridor artistic images accentuated preferably by a variety of different colors which are derived from light penetration through colored sides of the housing which frame and surround the solid or opaque portions formed by the numerous mirrors. The images so produced are flung into organized infinity and rectangular framing elements, preferably of dark colored rod or line shape, are magnified by two or more sets of opposing mirrors, the mirrors being framed in and preferably of oval shape with their longitudinal center lines in each opposing set being crossed.

A further object is the provision comprising a housing of three-dimensional shape, and preferably cubical, which has a plurality of its sidewalls made of transparent sheets of variously highly colored materials and wherein opposing walls of the cubical or housing have attached thereto and on the interior thereof elongate mirrors which, in the case of opposite walls, have their longitudinal center lines in crossed relationship. Viewing apertures are provided through central portions of several of said mirrors and are additionally provided through arc bowed triangles formed at the longitudinal sides of the mirror portions in sheets constituting the walls which are transparent and in numerous instances colored. To augment and add in harmony with the corridorlike multiple reflection images and illusions created, the inner corners of the numerous walls of the cubical are defined by narrow straight line rods or strips of preferably black or contrasting color to the other colors used in the transparencies of the walls.

The images or illusions of infinite and decreasing size reproduction are enhanced by the multiple reproduction through reflections of the said black or rectangular walls defining each side of the cubical at the interior. The oval shape and crossed relation of opposing interior mirrors (some with view aperture centrally therethrough) assures maximum reflection and maximum sight by the human eye.

In viewing the interior through the various viewing apertures, a great number of variegated images are produced. For example, when the iris of the eye is applied to the triangular arc-bounded viewing portions, all of the opposing sets of mirrors come into functional relation and with colors on the transparent sheets constituting the walls very artistic psychedelic images are produced.

The foregoing and other objects will be more apparent in connection with the following description made in connection with the accompanying drawings wherein.

Figure 1:
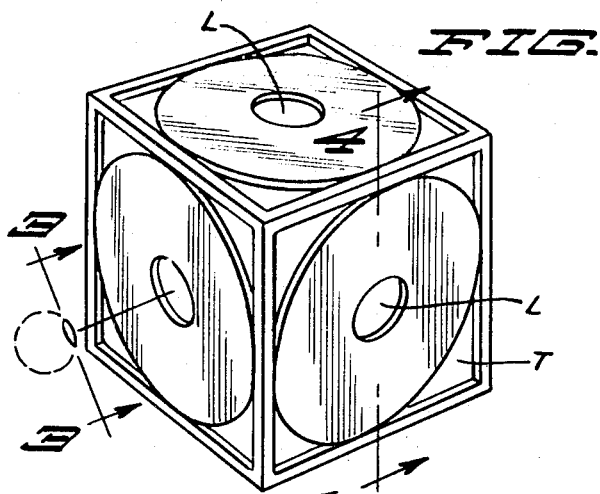
FIG. 1 is a perspective view of an embodiment of my invention completed and ready for use in viewing.
Figure 3:
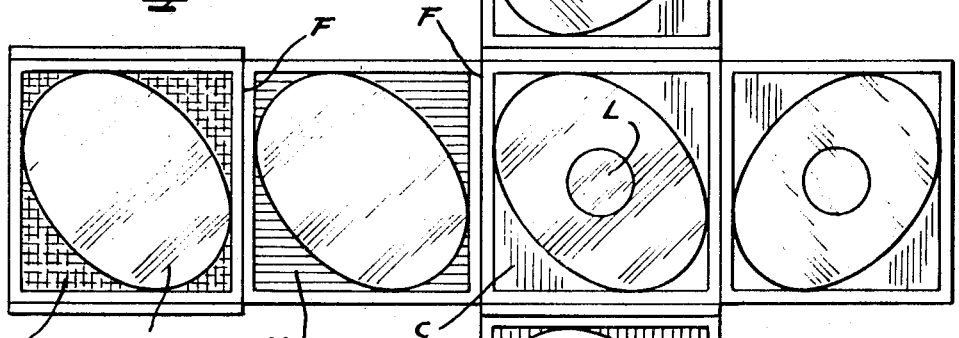
Figure 3:
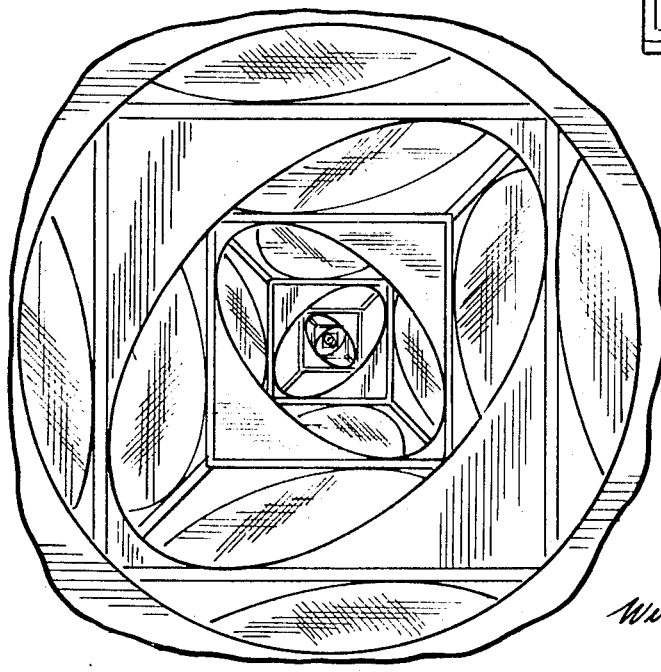
Figure 4:
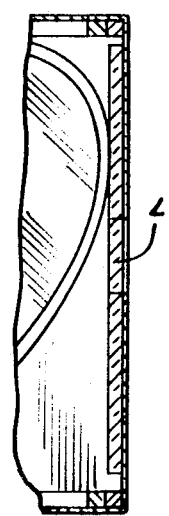

FIG. 3 is a view showing, in general aspects, the optical illusion or artistic image produced by a human eye as applied to one of the central apertures of one of the mirrors; and FIG. 4 is a fragmentary cross section taken substantially along the line 4—4 of FIG. 1 showing in cross section one of the mirrors and fragments of the vertical wall on which the mirror is attached and suspended and also showing a variation on the rearmost mirror viewed in that the marginal edge thereof is colored black to produce even additional infinity of configuration throughout the corridors reflectively obtained.

It is to be understood that there are many ways of constructing the overall combinative entity of my artistic viewing device.

Thus, in the form or species of the invention disclosed in the drawings, the walls of a cubical three-dimensional housing are constructed from a single cross-shaped blank of transparent sheet material, such as numerous plastics, which may be folded on predetermined fold lines and will retain their shape with preferably some reinforcing to, when secured together, form the housing shown in FIG. 1.

Figure 2:
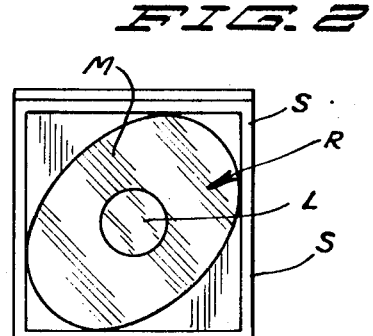
FIG. 2 is a top plan view of a blank made from flexible material, such as plastic, laid out flatwise before being folded along the essential fold lines to produce the cubical shown in operative position in FIG. 1.

In FIG. 2 the cross-shaped blank, indicated as an entirety by the letter S, of transparent sheet material is shown laid out flatwise with what constitutes the interior surfaces being uppermost. The blank, as shown, is divided into six rectangular wall sections, indicated as an entirety by the letter R, upon each of which is bonded or otherwise firmly secured a thin opaque rectangular frame 5 made of substantially rigid material and preferably of a dark color such as brown or black. Framed within each of the rectangular frames R is a reflective mirror, indicated as M, preferably in each instance being of elongate, oval or oblong shape, closely framed within the frame 5 in each instance, and adhesively bonded or otherwise secured to the inner surface of the plastic sheet S. The plastic sheet is foldable and will hold a crease along the numerous fold lines F, indicated, and the frames 5 are so secured to the blank sheet S that they may be folded inwardly substantially in contact with the edges of the adjacent rectangular frames, as shown in FIG. 4. It will be noticed that the longitudinal center lines of the mirrors M are so disposed diagonally of the rectangular frames 5 that opposing mirrors will have their longitudinal center lines, when a cubical is formed, crossed or disposed perpendicularly in opposing pairs. A plurality of the mirrors have transparent circular viewing portions from which the reflective material is removed or an aperture may be made if desired to accommodate the iris of a human eye, in size and shape, disposed at the exterior of the cubical housing. Such transparent central sections are indicated by the letter L.

It will be seen that the oval-shaped mirrors M, in the form illustrated, are closely framed within the rectangular respective frames 5 to leave triangular transparent portions of the sheet T bounded inwardly by the arcuate lines formed by the mirrors. Through these transparent portions T the interior and images produced by the reflectors, in combination with color schemes, the opaque rectangular frameworks 5 may be viewed, as well as through the transparent circular portions L, and when so viewed, the optical illusions or images produced are much more complex and vary widely from the images seen by the human eye when the interior is viewed through the centrally disposed transparent circles L.

To further create variegated and psychedelic color and reflective effects, it is desirable to coat or apply thin transparency sheets to a plurality of the rectangular portions R. Thus in FIG. 2 it will be seen that a brilliant yellow color or sheet Y has been applied either externally or internally of the main plastic blank sheet S and triangulate portions of this colored sheet Y are left beyond the peripheral edges of the respective mirror M associated therewith. In the next rectangular section R, to the right of the one previously described, a red sheet, or brilliant color X, is provided behind its respective mirror M, and in the depending rectangular portion R in FIG. 2 a blue sheet, or color transparency, surrounds its respective mirror and is adhered or otherwise secured to the transparent blank sheet S.

In folding and operatively setting up the cubical from the blank sheet S and its superimposed but attached portions including the rectangular frames 5, and the mirrors M and sheets of color, the rectangular tabs or sheets projecting from one referred to as the central sheet, indicated by C in FIG. 2, are folded inwardly at right angles to rectangular sheet C and the adjacent relatively rigid reinforcing frames 5 may be bonded together, or otherwise secured, to retain the walls in generally boxlike formation. Thereafter the wall section R at the left, and having the yellow color applied thereto, is turned inwardly to lie flush against the lower or outermost edges of the tab sections previously referred to, and the frame members are all secured together to form a cubical housing, as shown in FIG. 1, and also in FIG. 4.

It will be understood that the several rectangular wall sections will be rigidly secured together as by bonding adhesively of the abutting straight elements of the respective rectangular sections R, or, if desired, pressure-sensitive adhesion tape in narrow strips may further serve (not shown) to retain the straight line corner edges of the cubical together in relatively rigid relation.

ARTISTIC OPTICAL ILLUSIONS PRODUCED

In viewing the interior of the mirrored cubical, the housing should be kept away from opposing direct rays of light to obtain the most artistic illusions. When the interior is viewed with the iris of one eye positioned next to one of the transparent central viewing portions L, a great multiplicity of successively smaller oval, corridored, square and oval tunnels are seen almost in infinity surrounded by patches and solid reflective views of the various colors employed in certain of the sidewalls. The optical illusions produced, when viewing is done through the central transparencies L, also includes a great multiplicity of dark thin rectangulate corridors which are combined geometrically and attractively with the corridors produced by the oval lines.

When the device is viewed from a second transparent viewing central spot L, a new colored variety of corridor or tunnel configuration diminishing in general area is seen.

When the interior of the view is viewed from a variety of the triangulate transparent viewing portions T, more complex corridor and tunnel designs with great combinations of optical illusions are produced from all of the different mirrors in the cubical, and here again, depending on the corner of the wall having a transparency T which is chosen, various psychedelic and color variety fragments and images are produced harmonizing and being symmetrical in shape while constantly decreasing in area and size from the portion of the tunnel nearest to the viewing eye.

The iris of the eye viewing is reproduced in color and many magnifications and reductions symmetrically with the tunnel, and appears to the viewer.

To further somewhat complicate the overall optical illusions created, the peripheral edges, as shown in FIg. 4, of the various mirrors may be darkened or provided with contrasting color peripheral bands which creates a great multiplicity of constantly decreasing images in the overall optical illusion produced.

From the foregoing it will be seen that I have provided a simple, compact, artistic viewer device depending on shapes and a multiplicity of mirrors or reflectors for producing highly artistic optical illusions of substantial variety.

It will of course be understood that the cubical and the walls thereof may be constructed of various materials, preferably transparent, with the elongate mirrors in spaced opposing pairs being preferably crossed relative to their longitudinal axes. It is to be understood that the viewer housing may be made of widely varying dimensions, not only in cubical form but in various three-dimensional forms, some of which will include various types of parallelepipeds.

What is claimed is:

1. An artistic viewer for producing a variety of symmetrical and harmonious optical illusions having in combination,
    a three-dimensional housing having at least two pairs of spaced, opposing generally parallel sides constructed of sheet material through which light will pass, at least two pairs of opposed mirrors mounted respectively interiorly of said opposing sides and occupying less area than the total area of said sides thereby leaving light-transmissive generally triangular spaces between the marginal edges of said reflectors and the marginal edges of said respective sides, and
    at least one of said reflectors having a transparent viewing portion disposed medially thereof through which the interior of said housing, including said opposing mirror, may be viewed by a human eye.

2. The structure and combination as defined in claim 1 further characterized by the sides of said housing being of generally rectangular configuration and said two sets of opposing sides having dark opaque framing at the peripheral edges thereof, said framing serving in the manifold reflections produced by said mirrors to combine in producing a great series of rectangular configurations with reflections based on the edges of said reflectors in a symmetrical overall optical illusion.

3. The structure and combination set forth in claim 1 further characterized by a plurality of adjacent walls of said housing, with the exception of the areas of said mirrors, being constituted of highly colored transparent material.

4. The structure set forth in claim 1 wherein the configuration of said walls is generally of polygonal shape and wherein said reflectors are generally of oval shape.